(12) United States Patent
Capoglu et al.

(10) Patent No.: US 10,466,380 B2
(45) Date of Patent: Nov. 5, 2019

(54) UTILIZING DIVERSE EXCITATION SOURCES IN ELECTROMAGNETIC RANGING

(71) Applicant: Halliburton Energy Services, Inc., Houston, TX (US)

(72) Inventors: Ilker R. Capoglu, Houston, TX (US); Burkay Donderici, Houston, TX (US); Baris Guner, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/558,589

(22) PCT Filed: Sep. 23, 2016

(86) PCT No.: PCT/US2016/053432
§ 371 (c)(1),
(2) Date: Sep. 15, 2017

(87) PCT Pub. No.: WO2018/056999
PCT Pub. Date: Mar. 29, 2018

(65) Prior Publication Data
US 2018/0329105 A1    Nov. 15, 2018

(51) Int. Cl.
*G01V 3/20* (2006.01)
*E21B 47/022* (2012.01)
(Continued)

(52) U.S. Cl.
CPC .......... *G01V 3/20* (2013.01); *E21B 47/02216* (2013.01); *G01V 3/18* (2013.01);
(Continued)

(58) Field of Classification Search
CPC ... G01V 3/18; G01V 3/20; G01V 3/26; G01V 3/28; G01V 3/38; E21B 43/2406; E21B 47/12; E21B 47/02216
See application file for complete search history.

(56) References Cited

U.S. PATENT DOCUMENTS

| 4,372,398 A | 2/1983 | Kuckes |
| 4,791,373 A | 12/1988 | Kuckes |

(Continued)

FOREIGN PATENT DOCUMENTS

| EP | 2011826018 | 7/2013 |
| EP | 2013861395 | 10/2015 |

(Continued)

OTHER PUBLICATIONS

International Search Report and Written Opinion for Application No. PCT/US2016/053432 dated Jun. 12, 2017.

*Primary Examiner* — David M. Gray
*Assistant Examiner* — Michael A Harrison
(74) *Attorney, Agent, or Firm* — Jason Sedano; C. Tumey Law Group PLLC

(57) ABSTRACT

Systems and methods for utilizing diverse excitation sources in single well electromagnetic ranging. A method may include disposing an electromagnetic ranging tool in a wellbore, wherein the electromagnetic ranging tool may comprise one or more receivers, a coil source and an electrode source; performing a measurement with the one or more receivers of at least one component of a coil-induced magnetic field from the target wellbore to provide a coil measurement, wherein the coil-induced magnetic field may be induced by the coil source; performing a measurement with the one or more receivers of at least component of an electrode-induced electromagnetic field to provide an electrode measurement, wherein the electrode-induced electromagnetic field may be induced by the electrode source; and (Continued)

calculating at least one ranging parameter using, at least in part, the coil measurement and the electrode measurement.

20 Claims, 10 Drawing Sheets

(51) Int. Cl.
    *G01V 3/18* (2006.01)
    *G01V 3/28* (2006.01)
    *G01V 3/38* (2006.01)
    *G01V 3/26* (2006.01)
    *E21B 43/24* (2006.01)
    *E21B 47/12* (2012.01)

(52) U.S. Cl.
    CPC .................. *G01V 3/26* (2013.01); *G01V 3/28* (2013.01); *G01V 3/38* (2013.01); *E21B 43/2406* (2013.01); *E21B 47/12* (2013.01)

(56) References Cited

U.S. PATENT DOCUMENTS

| | | | |
|---|---|---|---|
| 4,933,640 | A | 6/1990 | Kuckes |
| 5,084,678 | A | 1/1992 | Hutin |
| 6,710,601 | B2 | 3/2004 | Rosthal et al. |
| 9,157,317 | B2 | 10/2015 | Mitchell et al. |
| 9,562,988 | B2 | 2/2017 | Wilson |
| 9,625,605 | B2 | 4/2017 | Martin et al. |
| 9,696,451 | B2 | 7/2017 | Lei et al. |
| 2009/0030615 | A1 | 1/2009 | Clark |
| 2009/0308657 | A1 | 12/2009 | Clark et al. |
| 2012/0013339 | A1* | 1/2012 | Kuckes ............ E21B 47/02216 324/346 |
| 2015/0091577 | A1 | 4/2015 | Donderici et al. |
| 2015/0268371 | A1 | 9/2015 | Donderici et al. |
| 2016/0003962 | A1 | 1/2016 | Sena |
| 2016/0216397 | A1 | 7/2016 | Donderici et al. |
| 2016/0273337 | A1 | 9/2016 | Donderici et al. |
| 2016/0369626 | A1 | 12/2016 | Donderici et al. |

FOREIGN PATENT DOCUMENTS

| | | |
|---|---|---|
| WO | 2014089490 | 6/2014 |
| WO | 2015073484 | 5/2015 |

\* cited by examiner

UTILIZING DIVERSE EXCITATION SOURCES IN ELECTROMAGNETIC RANGING

BACKGROUND

Wellbores drilled into subterranean formations may enable recovery of desirable fluids (e.g., hydrocarbons) using a number of different techniques. Knowing the location of a target wellbore may be important while drilling a second wellbore. For example, in the case of a target wellbore that may be blown out, the target wellbore may need to be intersected precisely by the second (or relief) wellbore in order to stop the blow out. Another application may be where a second wellbore may need to be drilled parallel to the target wellbore, for example, in a steam-assisted gravity drainage ("SAGD") operation, wherein the second wellbore may be an injection wellbore while the target wellbore may be a production wellbore. Yet another application may be where knowledge of the target wellbore's location may be needed to avoid collision during drilling of the second wellbore.

Electromagnetic ranging tools may be employed in subterranean operations to determine direction and distance between two wellbores. Electromagnetic ranging tools may use different techniques to obtain current on a conductive member in the target wellbore. Without limitation, approaches may include directly injecting a current into the conductive member and/or inducing a current on a conductive member by transmitting electromagnetic fields by coil antennas positioned in a second wellbore. The induced current in turn may cause the casing to radiate a secondary electromagnetic field. In another approach, an electrode type source may be used to induce current on the conductive member. The gradient of the magnetic field radiated by the conductive member in addition to the magnetic field itself may be measured. Using a relationship between the magnetic field and its gradient, a ranging measurement may be calculated. Alternatively, an inversion may be used to determine the range, in which a forward model of the signal that may be received at the ranging tool may be needed. The inversion process may try to find the formation and well parameters that would match the forward model with the measurements made by the tool.

BRIEF DESCRIPTION OF THE DRAWINGS

These drawings illustrate certain aspects of some examples of the present disclosure, and should not be used to limit or define the disclosure.

DETAILED DESCRIPTION

Figure 1:
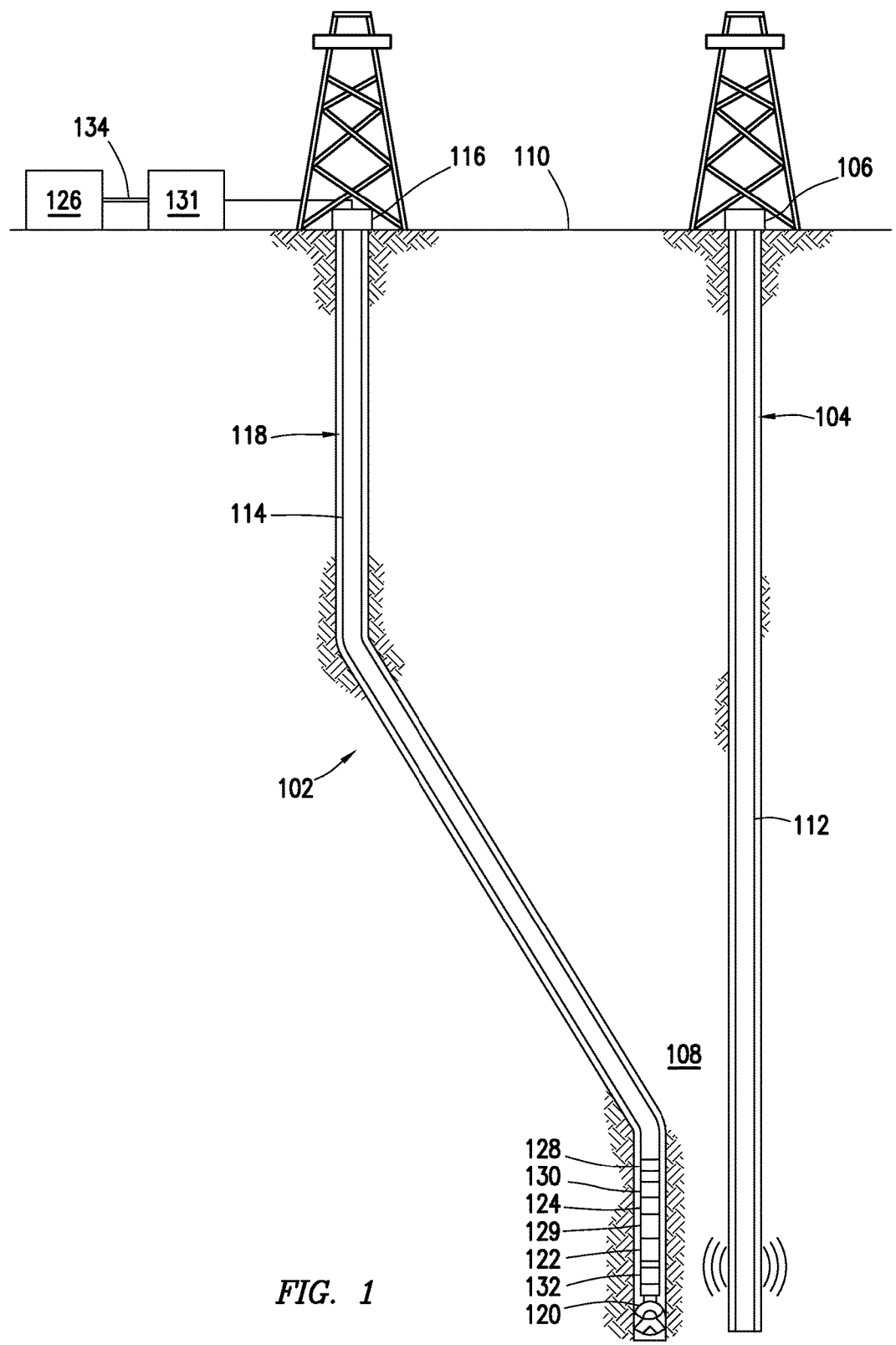
FIG. 1 is a schematic illustrates of an example electromagnetic ranging system in a wellbore.

This disclosure may generally relate to electromagnetic (EM) ranging methods for well intervention, well avoidance, and steam assisted gravity drainage (SAGD) applications, among others. More specifically, it may describe systems and methods for combining two different excitation methods (e.g., electrode and coil) in a complementary fashion such that their differences and commonalties, such as, for example, common quality factors, may be exploited to the fullest extent. Downhole excitation may require that both the electrode and coil sources that excite the formation and the receivers reside on the bottom-hole assembly (BHA).

Under certain circumstances, electrode and coil excitation may be complementary. For example, electrode excitation may perform very poorly at a T-intersection with a target well, while coil excitation may not. On the other hand, electrode excitation may give better results at a T-intersection near the end of the target well. In addition, coil excitation may not differentiate between target wells that are on opposite sides of the BHA (e.g., 180° direction ambiguity), while electrode excitation may be able to differentiate in this circumstance. Electrode excitation may require an electrically insulated gap between the electrodes, while coil excitation may not have such a requirement. An insulated gap near a transmitting or receiving coil may improve the overall gain of the coil. While coil excitation may perform well for both conductive and resistive drilling muds, electrode excitation may not work well with conductive mud. Electrode excitation may be less sensitive to the formation resistivity than coil excitation. These properties are summarized for reference in Table 1 under the "Examples" section of this disclosure.

Electromagnetic ranging tools disclosed herein may include a coil source and an electrode source, for example, to maximize synergy between the two sources. By way of example, common features between electrode and coil sources may be utilized for minimal extra hardware requirements. The placement of each component (e.g., electrode, coil, insulated sub, etc.) may be selected, for example, to maximize the use of space on the BHA. Additionally, joint inversion and processing methods may be used for interpreting the measurements from the two constituents of the system.

Systems and methods of the present disclosure may be implemented, at least in part, with an information handling system. An information handling system may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates an electromagnetic ranging system 2. As illustrated, a target wellbore 104 may extend from a first wellhead 106 into a subterranean formation 108 from a surface 110. Generally, target wellbore 104 may include horizontal, vertical, slanted, curved, and other types of wellbore geometries and orientations. Target wellbore 104 may be cased or uncased. A conductive member 112 may be disposed within target wellbore 104 and may comprise a metallic material that may be conductive and magnetic. By way of example, conductive member 112 may be a casing, liner, tubing, or other elongated steel tubular disposed in target wellbore 104. Determining the position and direction of target wellbore 104 accurately and efficiently may be required in a variety of applications. For example, target wellbore 104 may be a "blowout" well. Target wellbore 104 may need to be intersected precisely by a second wellbore 114 in order to stop the "blowout." Alternatively, it may be desired to avoid collision with target wellbore 104 in drilling second wellbore 114 or it may be desired to drill the second wellbore parallel to the target wellbore 104, for example, in SAGD applications. In examples, target wellbore 104 may not be accessible and/or information about the position and structure of target wellbore 4 may not be available. As will be discussed in more detail, electromagnetic ranging system 102 may be used for determining the location of target wellbore 104 with respect to second wellbore 114.

With continued reference to FIG. 1, second wellbore 114 may also extend from a second wellhead 116 that extends into subterranean formation 108 from surface 110. Generally, second wellbore 114 may include horizontal, vertical, slanted, curved, and other types of wellbore geometries and orientations. Additionally, while target wellbore 104 and second wellbore 114 are illustrated as being land-based, it should be understood that the present techniques may also be applicable in offshore applications. Second wellbore 114 may be cased or uncased. In examples, a drill string 118 may begin at second wellhead 116 and traverse second wellbore 114. A drill bit 120 may be attached to a distal end of drill string 118 and may be driven, for example, either by a downhole motor and/or via rotation of drill string 118 from surface 110. Drill bit 120 may be a part of BHA 122 at distal end of drill string 118. While not illustrated, BHA 122 may further comprise one or more of a mud motor, power module, steering module, telemetry subassembly, and/or other sensors and instrumentation as will be appreciated by those of ordinary skill in the art. As will be appreciated by those of ordinary skill in the art, BHA 122 may be a measurement-while drilling (MWD) or logging-while-drilling (LWD) system.

Without limitation, electromagnetic ranging system 102 may comprise an electromagnetic ranging tool 124. While FIG. 1 illustrates use of electromagnetic ranging tool 124 on drill string 118, it should be understood that electromagnetic ranging tool 124 may be alternatively used on a wireline. Eleranging tool 124 may be a part of BHA 122. Electromagnetic ranging tool 124 may be ctromagnetic used for determining the distance and direction to target wellbore 114. Additionally, electromagnetic ranging tool 124 may be connected to and/or controlled by information handling system 126, which may be disposed on surface 110. In examples, information handling system 126 may communicate with electromagnetic ranging tool 124 through a communication line (not illustrated) disposed in (or on) drill string 118. In examples, wireless communication may be used to transmit information back and forth between information handling system 126 and electromagnetic ranging tool 124. Information handling system 126 may transmit information to electromagnetic ranging tool 124 and may receive as well as process information recorded by electromagnetic ranging tool 124. In addition, electromagnetic ranging tool 124 may include a downhole information handling system 128, which may also be disposed on BHA 122. Downhole information handling system 128 may include, without limitation, a microprocessor or other suitable circuitry, for estimating, receiving and processing signals received by the electromagnetic ranging tool 124. Downhole information handling system 128 may further include additional components, such as memory, input/output devices, interfaces, and the like. While not illustrated, the electromagnetic ranging tool 124 may include one or more additional components, such as analog-to-digital converter, filter and amplifier, among others, that may be used to process the measurements of the electromagnetic ranging tool 124 before they may be transmitted to surface 110. Alternatively, raw measurements from electromagnetic ranging tool 24 may be transmitted to surface 110.

In examples, electromagnetic ranging tool 124 may comprise a coil source 129, an electrode source 130, and/or a receiver 132. It should be noted that electromagnetic ranging tool 124 may comprise a plurality of coil sources 129, electrode sources 130, and/or receivers 132. The plurality of coil sources 129, electrode sources 130, and/or receivers 132 may be disposed along a longitudinal axis of the electromagnetic ranging tool 124. Coil source 129 may include any suitable type of electromagnetic coil, including, without limitation, tilted magnetic coils. Electrode source 130 may include any suitable type of electrode source 130, including, without limitation, a pair of spaced electrodes. By way of example, one of the electrodes may be arranged as the source electrode while the other electrode may be arranged as the return electrode. Those of ordinary skill in the art will appreciate that the coil source 129 and/or the electrode source 130 may be capable of inducing a magnetization in conductive and conductive member 112 disposed in target wellbore 104. As disclosed, the concepts that are described herein are valid for any type receiver 132, including, without limitation, wire antenna, toroidal antenna and/or azimuthal button electrodes, and/or receiver coils.

Any suitable technique may be used for transmitting signals from electromagnetic ranging tool 124 to surface 110, including, but not limited to, wired pipe telemetry, mud-pulse telemetry, acoustic telemetry, and electromagnetic telemetry. While not illustrated, BHA 122 may include a telemetry subassembly that may transmit telemetry data to the surface. Without limitation, a transmitter in the telemetry subassembly may be operable to generate pressure pulses in the drilling fluid that propagate along the fluid stream to surface 110. At surface 110, pressure transducers (not shown) may convert the pressure signal into electrical signals for a digitizer 131. Digitizer 131 may supply a digital form of the telemetry signals to information handling system 126 via a communication link 134, which may be a wired or wireless link. The telemetry data may be analyzed and processed by information handling system 126. For example, the telemetry data could be processed to determine location of target wellbore 104. With the location of target wellbore 104, a driller could control the BHA 122 while drilling second wellbore 114 to intentionally intersect target wellbore 104, avoid target wellbore 104, and/or drill second wellbore 114 in a path parallel to target wellbore 104.

Figure 2:
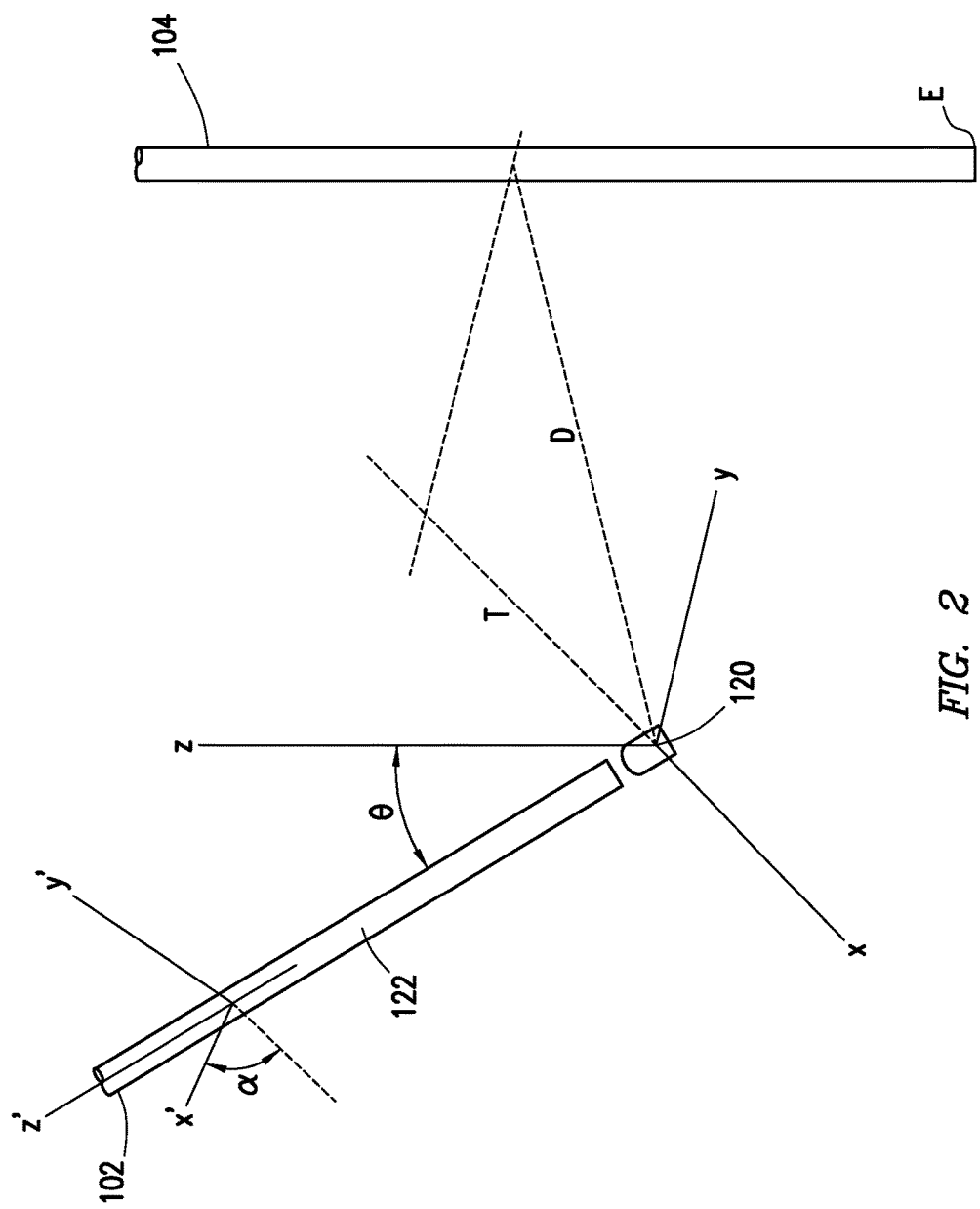
FIG. 2 is a schematic illustration of example geometry of a ranging system.

The geometry of electromagnetic ranging system 102 is illustrated in FIG. 2. A global coordinate system xyz may be set up such that the target wellbore 104 may be parallel to the z axis and the BHA 122 may be in the y-z plane. The BHA 122 may make an angle θ with the z axis, referred to as the inclination angle. The drill bit 120 may be at a distance D away from the target wellbore 104. The angle α that the local coordinate system x'y'z' of the BHA 122 makes with the global coordinate system xyz may be referred to as the direction to the target wellbore 104. The end of the target wellbore 104 may be at z=−E, and the target wellbore 104 may lie in the plane x=−T. Electromagnetic ranging system may be used to determine ranging parameters, such as D, θ, α, E, and T, from electromagnetic-field measurements made on the BHA 122. By way of example, one or more drilling parameters for drilling second wellbore 114 (e.g., shown on FIG. 1) may be adjusted in response to the ranging parameters. The electromagnetic-field measurements may be made at multiple receivers 132 (e.g., shown on FIG. 1) on the BHA 122, separated axially from each other. Radially separated receivers 132 may also be present. Measurements may be taken at multiple azimuthal orientations of the BHA 122, either through the rotation of the BHA 122 or placement of receivers 132 with varying azimuthal orientations.

Figure 3A:
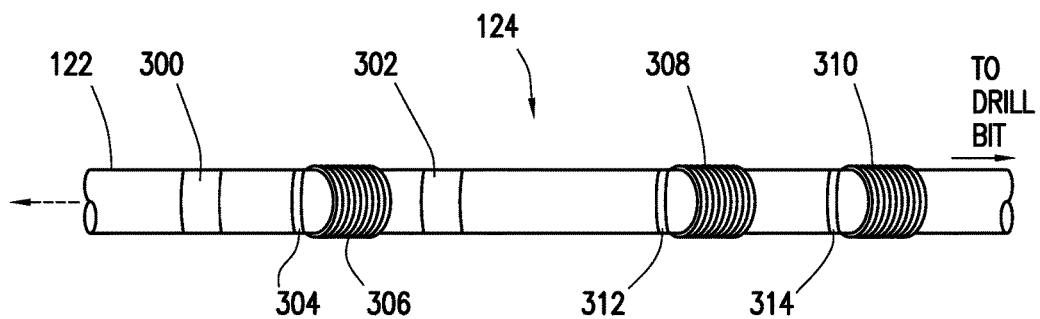
FIGS. 3A-3C are schematic illustrations of example electrode configurations.
Figure 3B:
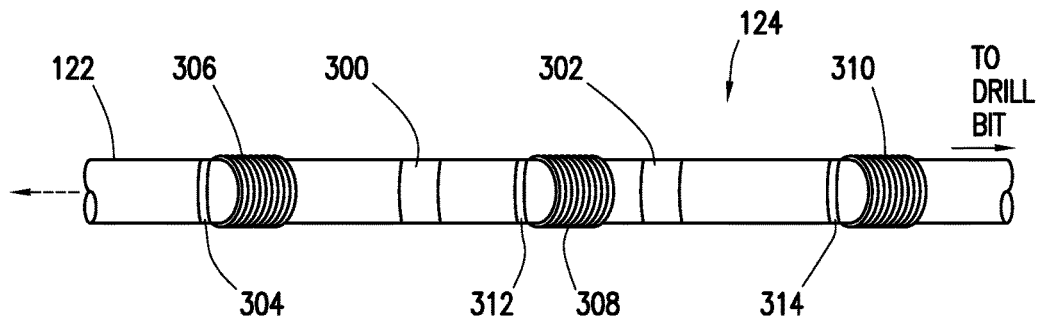
Figure 3C:
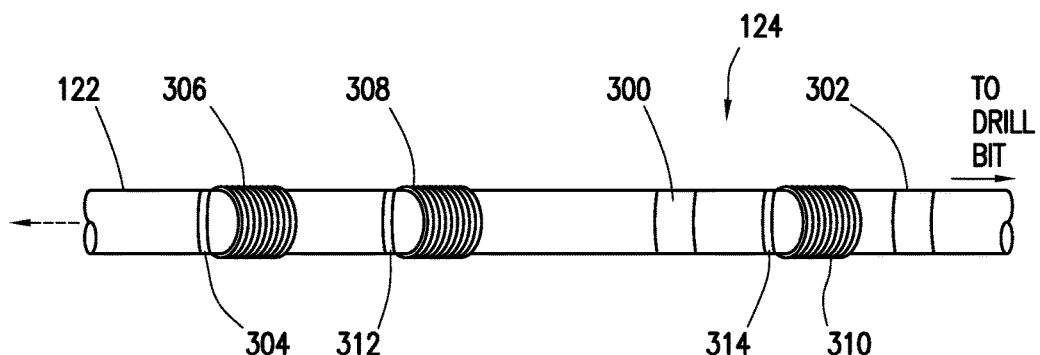

FIGS. 3A-3C illustrate three example coil-electrode configurations. The coil-electrode configurations illustrated on FIGS. 3A-3C may be used, for example, to implement a coil source and an electrode source in an electromagnetic ranging tool 124. As illustrated, a first electrode 300 and a second electrode 302 (e.g., one source electrode and one return electrode) may be installed along the length of the BHA 122. Electromagnetic ranging tool 124 may further comprise a first insulated gap sub 304. As illustrated, insulated gap sub 304 may be located between the first electrode 300 and the second electrode 302, for example, to prevent shorting of the current through the BHA 122. Electromagnetic ranging tool 124 may further comprise electromagnetic coils, illustrated as first electromagnetic coil 306, second electromagnetic coil 308, and third electromagnetic coil 310, positioned along the length of the BHA 122. As illustrated, the electromagnetic coils may be implemented as tilted electromagnetic coils. The tilt angle of the electromagnetic coils may be arbitrary, but may be greater than 10° (from z-directed) The three configurations in FIGS. 3A-3C may differ in the positioning of the electromagnetic coils with respect to first electrode 300 and second electrode 302. In FIG. 3A, the first electrode 300 and second electrode 302 may be positioned on opposite sides of first electromagnetic coil 306 which is the further of the electromagnetic coils from the drill bit 120 (e.g., shown on FIG. 1). In FIG. 3B, the first electrode 300 and second electrode 302 may be positioned on opposite sides of second electromagnetic coil 308 which is positioned between the first electromagnetic coil 306 and the third electromagnetic coil 310. In FIG. 3C, the first electrode 300 and second electrode 302 may be positioned on opposite sides of third electromagnetic coil 310 which is the closest of the electromagnetic coils to the drill bit 120 (shown on FIG. 1). Horizontal components (i.e., normal to z) of the magnetic moments of the electromagnetic coils do not have to be substantially in the same plane, but the electromagnetic coils may be implemented in this manner as desired for particular applications.

In addition to first insulating gap sub 304 shown on FIG. 3A between first electrode 300 and second electrode 302, electromagnetic ranging tool 124 may further comprise second insulating gap sub 312 and third insulating gap sub 314. As illustrated, the insulating gap subs may be disposed close (e.g., within about 10 feet or less) to one of the electromagnetic coils. For example, first electromagnetic coil 306 may reside close to the first insulated gap sub 304, second electromagnetic coil 308 may reside close to second insulated gap sub 312, and third electromagnetic coil 310 may reside close to third insulated gap sub 314. The insulated gap subs may have a positive effect on the performance of the corresponding electromagnetic coils, for example, increasing its effective gain as a transmitter or receiver. In addition to increasing the gain of the electromagnetic magnetic coils, the insulated gap subs may also serve to block the axial BHA 122 current near the electromagnetic coils.

One or more of the first electromagnetic coil 306, second electromagnetic coil 308, and third electromagnetic coil 310 may be implemented as receivers (e.g., receiver 132 shown on FIG. 1). Instead of using individual electromagnetic coils as a receiver, a plurality of electromagnetic coils placed in close axial locations with different azimuthal orientations may be used. In that case, the descriptions made in this disclosure may apply individually to sets of two or more electromagnetic magnetic receiver coils with the same orientation.

Figure 4A:
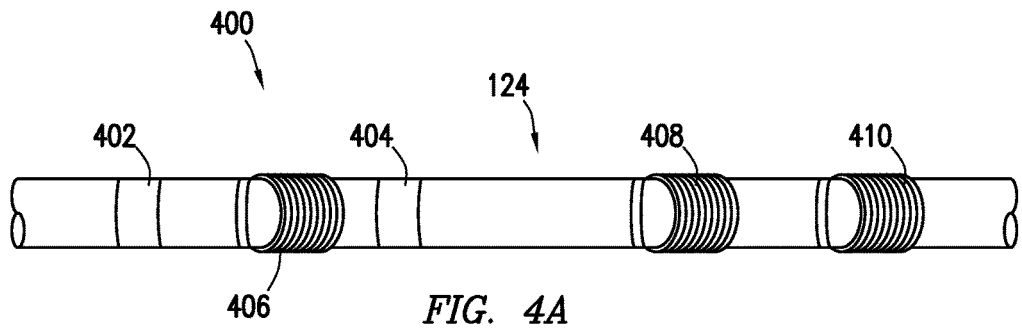
FIGS. 4A-4D are schematic illustrations of several example operating modes for different electrode configurations.
Figure 4B:
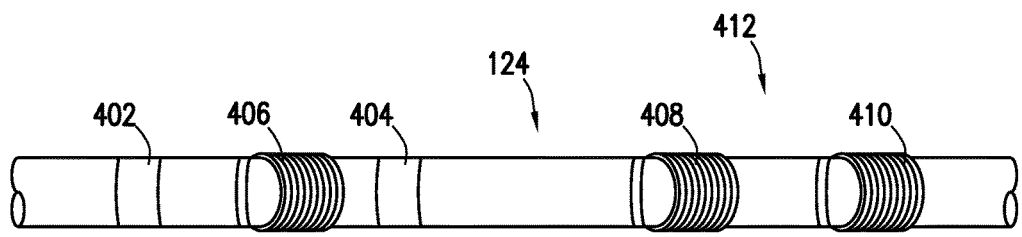
Figure 4C:
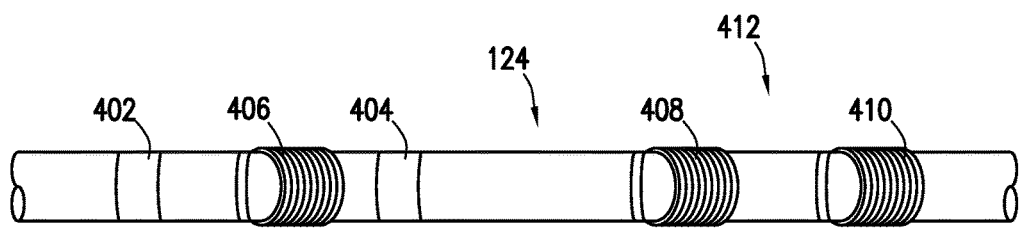
Figure 4D:
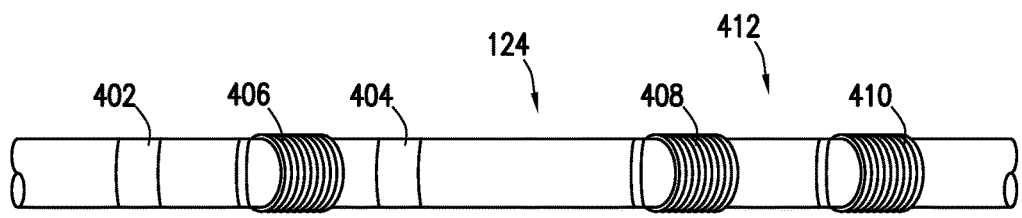

Several example operating modes/configurations of the combined electrode-configuration shown on FIG. 3A are illustrated in FIGS. 4A-4D. In FIG. 4A, an electrode-excitation subsystem 400 is shown in which first electrode 402 and second electrode 404 may be implemented as electrode source wherein the excitation may be performed through the electrode source. In electrode-excitation subsystem 400, second electromagnetic coil 408 and third electromagnetic coil 410 may be implemented as receivers, and first electromagnetic coil 406 may be inactive. FIGS. 4B-4D illustrate different arrangements of a coil-excitation subsystem 412. In FIGS. 4B-4D, one of the electromagnetic coils may be implemented as coil source, and the other two may be used as receivers. For example, in FIG. 4B, first electrode 402 and second electrode 404 may be inactive. Third electromagnetic coil 410 may be the coil source and first electromagnetic coil 406 and second electromagnetic coil 408 may be receivers. For example, in FIG. 4C, first electrode 402 and second electrode 404 may be inactive. Second electromagnetic coil 408 may be the coil source and first electromagnetic coil 406 and third electromagnetic coil 410 may be the receivers. By way of further example, in FIG. 4D, first electrode 402 and second electrode 404 may be inactive. First electromagnetic coil 406 may be the coil source and second electromagnetic coil 408 and third electromagnetic coil 410 may be the receivers.

If the electrode-excitation subsystem 400 in FIG. 4A is the only active one, the first electromagnetic coil 406 in between the first electrode 402 and second electrode 404 may be either open-circuited or short-circuited. If one of the coil-excitation subsystems 412 in FIGS. 4B-4D is the only active one, the first electrode 402 and second electrode 404 may be open-circuited. The electrode-excitation subsystem 400 in FIG. 4A may be operated simultaneously with any of the coil-excitation subsystems 412 in FIGS. 4B-4D. In this case, the first electromagnetic coil 406, second electromagnetic coil 408, third electromagnetic coil 410, first electrode 402, and second electrode 404 may all be active, either in transmitting or receiving mode/configuration. If operated simultaneously, the electrode-excitation subsystem 400 and coil-excitation subsystem 412 may utilize different frequencies. The processing methods described in the remainder of the disclosure may apply to both the simultaneous and non-simultaneous operation of the electrode-excitation subsystem 400 and coil-excitation subsystem 412.

The different electrode-excitation subsystem 400 and coil-excitation subsystems 412 shown in FIGS. 4A-4D both may have the capability to find ranging parameters, such as D, θ, α, E, and T, on their own. The combined system, using both electrode-excitation subsystem 400 and coil-excitation subsystems 412, however, may use these individual inversion algorithms to arrive at a better, more robust algorithm for estimating these unknowns. This may be done without changing the inner workings of the individual algorithms or fusing them into a single inversion algorithm.

The electrode-excitation subsystem 400 and coil-excitation subsystems 412 may be used to calibrate each other. More specifically, a quality factor Q may be calculated from the differences between the ranging parameters (e.g., D, θ, α, E, and T values) computed by the two methods:

$$Q = f(D_{elec} - D_{coil}, \theta_{elec} - \theta_{elec}, \alpha_{elec} - \alpha_{coil}, E_{elec} - E_{coil}, T_{elec} - T_{coil}) \quad (1)$$

where Q is the quality factor, $f$ is a monotonic function of all five arguments, with $f(0, 0, 0, 0, 0)=0$, $D_{elec}$ is the distance to the target wellbore 104 calculated with an electrode. $D_{coil}$ is the distance to the target wellbore 104 calculated with a coil. $\theta_{elec}$ is the inclination angle calculated with an electrode. $\theta_{coli}$ is the inclination angle calculated with a coil. $\alpha_{coil}$ is the direction to the target wellbore 104 calculated with an electrode. $\alpha_{coil}$ is the direction to the target wellbore 104 calculated with a coil. $E_{elec}$ is the end of the target wellbore 104 calculated with an electrode. $E_{coil}$ is the end of the target wellbore 104 calculated with a coil. $T_{elec}$ is the plane of the target wellbore 104 calculated with an electrode. $T_{coil}$ is the plane of the target wellbore 104 calculated with a coil.

This quality factor Q may be considered a measure of the robustness and reliability of the overall inversion. If the quality factor Q is too high, remedial steps may be taken to improve the inversion algorithms and the inversions for the electrode source and coil source may be repeated until the quality factor Q drops below a specific amplitude. Remedial steps that may be taken may include, but are not limited to, increasing the excitation current, extending the listening time, recalibrating the individual systems, retaking the measurements at different azimuths, using alternative optimization algorithms for inversion, and increasing the number of initial guesses in optimization algorithms. As illustrated by equation (1) above, quality factor Q between the electrode source and coil source may be estimated by utilizing a difference in ranging parameters (e.g., D, θ, α, E, and T). The common quality factor Q may be visualized and a target well shape may be calculated using the common quality factor Q. Depths of the well with a low common quality factor Q may be ignored. An inversion may be improved if the common quality factor Q is below a threshold. Function f can be selected such that quality is indicated low when $D_{elce} - D_{coil}$ is larger than 2 feet or $|D_{elec} - D_{coil}|/D_{coil}$ is larger than 0.2, where ∥ is the absolute value; when $\theta_{elec} - \theta_{coil}$ is larger than 10 degrees; when $\alpha_{elec} - a_{coil}$ is larger than 10 degrees; when $E_{elec} - E_{coil}$ is larger than 3 feet; or when $T_{elec} - T_{coil}$ is larger than 3 feet. Function f may indicate high quality when none of the above conditions are satisfied. As an example, f function may be sum of each of the above ranging parameters where each parameter is normalized by the corresponding threshold (for example the term corresponding to range may be $((D_{elec} - D_{coil})/2$ feet).

Figure 5:
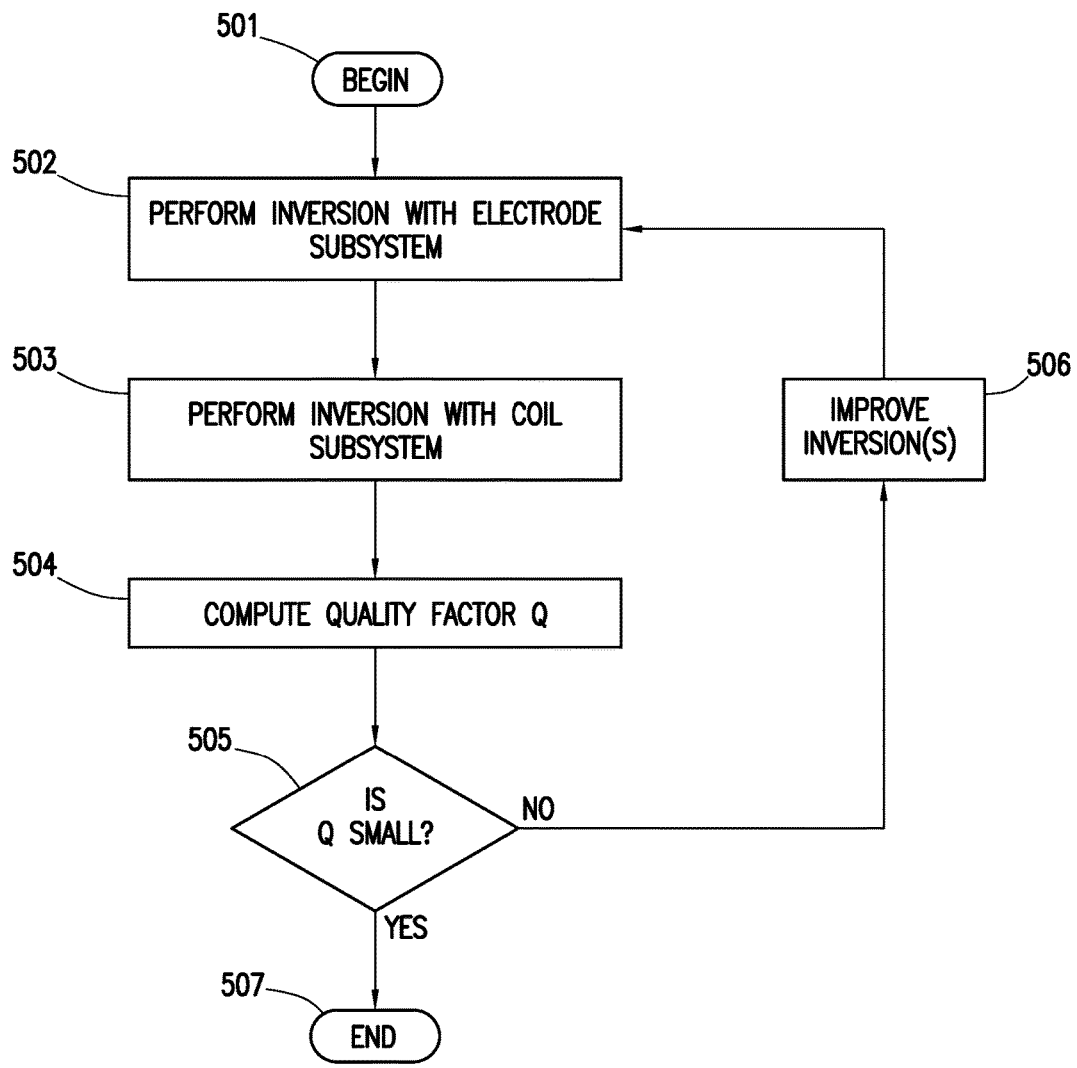
FIG. 5 illustrates a flow diagram of an example technique for estimation of a quality factor.

FIG. 5 illustrates an example method for using a common quality factor Q. At block 501, the method may begin. In block 502, an inversion may be performed with electrode-excitation subsystem 400 (shown in FIG. 4A). By way of example, the inversion may be performed using electrode measurements obtained by at least one receiver 132 (shown in FIG. 1) of at least one component of an electrode-induced electromagnetic field from target wellbore 104 (shown in FIG. 1). The electrode-induced electromagnetic field may be induced by electrode source. In block 503, an inversion may be performed with coil-excitation subsystem 412 (shown in FIGS. 4B-4D). By way of example, the inversion may be performed using coil measurements obtained by at least one receiver 132 of at least one component of a coil-induced electromagnetic field from target wellbore 104. The coil-induced electromagnetic field may be induced by coil source. Block 504 may compute a quality factor Q. The quality factor Q may be computed using any suitable technique. By way of example, the quality factor Q may be computed using Equation (1). In block 505, it may be determined if the qualify factor Q is small. By way of example, the quality factor Q may be compared to a threshold. If the quality factor Q is small in block 505, the method may end in block 507. If the quality factor Q is not small, the inversion(s) may be improved in block 506 by repeating blocks 501-505 until the quality factor Q is small and then the method may end in block 507. Improving the inversion(s) in block 506 may include implementation of remedial steps, including those previously described, such as increasing the excitation current, extending the listening time, recalibrating the individual systems, retaking the measurements at different azimuths, using alternative optimization algorithms for inversion, and/or increasing the number of initial guesses in optimization algorithms.

Figure 6:
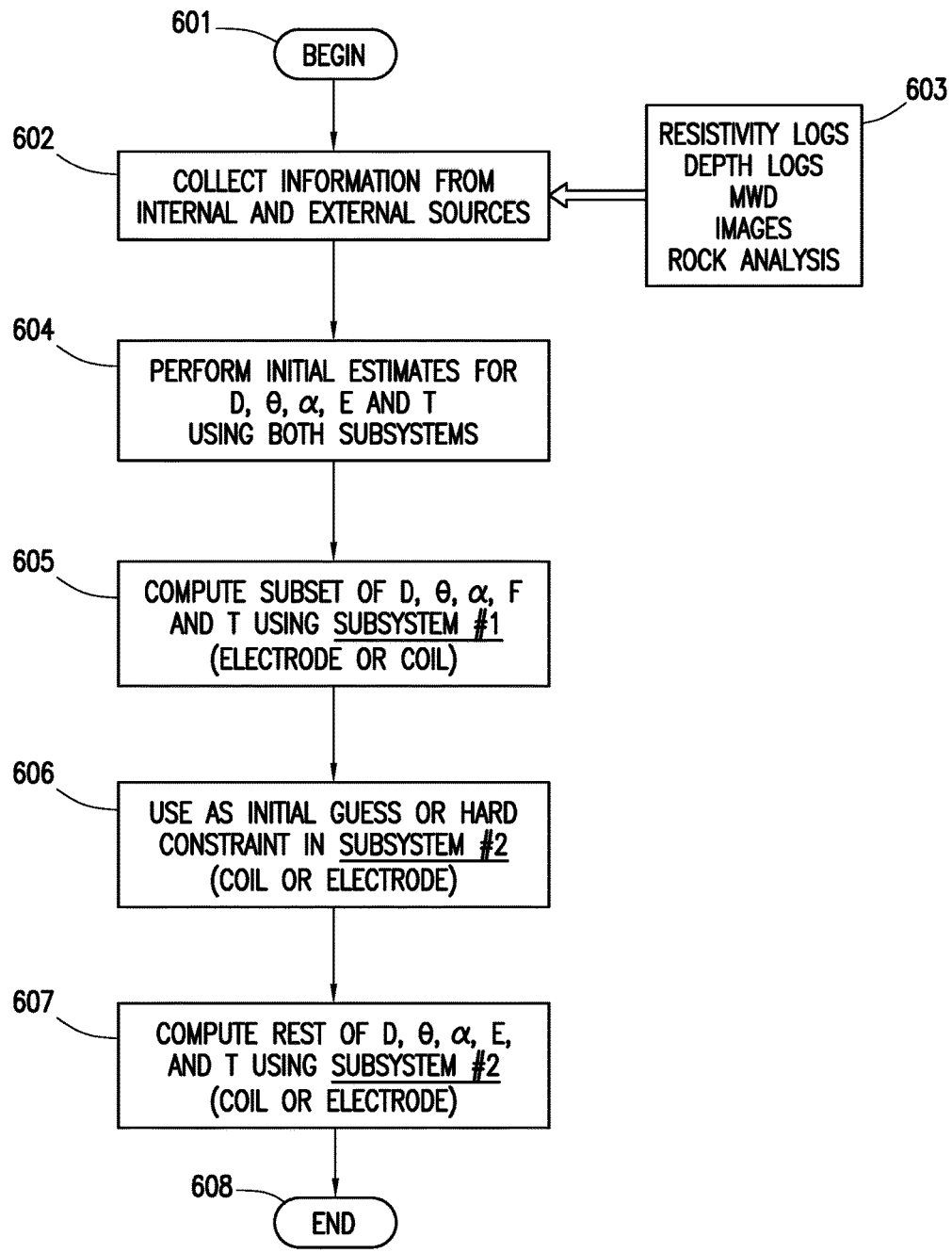
FIG. 6 illustrates a flow diagram of an example multi-step inversion.

FIG. 6 illustrates a flow diagram of an example multi-step inversion that may be carried out using the two subsystems. The inversion algorithm of one of the subsystems may be used to determine one or more (e.g., but not all) of the ranging parameters, such as D, θ, α, E, and T. In block 601, the method may begin. In block 602, information may be collected from internal and external sources such as, for example, current and/or previous inversion results from individual subsystems and/or external sources, such as, for example, resistivity logs, depth logs, measuring-while-drilling (MWD) records, borehole images, and/or rock analysis methods, as shown in block 603. In block 604, initial estimates may be performed for the ranging parameters (e.g., D, θ, α, E, and T). Once a subset of the ranging parameters (e.g., D, θ, α, E, and T) may be determined by a first subsystem (e.g., electrode-excitation subsystem 400 (shown in FIG. 4A) or coil-excitation subsystems 412, shown in FIGS. 4B-4D), as shown in block 605, one or more of these values may be used as initial guesses or hard constraints for the second subsystem (if the first subsystem is the electrode-excitation subsystem 400, then the second subsystem is coil-excitation subsystem 412 and if the first subsystem is the coil-excitation subsystem 412 then the second subsystem is the electrode-excitation subsystem 400), as shown in block 606. In block 607, the rest of ranging parameters (e.g., D, θ, α, E, and T) may be computed using the second subsystem. In block 608, the method may end.

Electrode and coil excitation methods may have unique strengths in non-overlapping parameter ranges. Depending on the ranging application (well avoidance, well interception, SAGD), the ranging parameters (e.g., D, θ, α, E, and T) that are unknown may be divided between the two methods in different ways. An example of this may be the SAGD scenario. If one or more of the subsystems indicate that the inclination angle θ is close to 0° (for example, smaller than 10° or smaller than 5°), the determination of α may be assigned to the electrode-excitation subsystem 400, since the coil-excitation subsystem 412 may suffer from 180° direction ambiguity in that regime. The α value found by the electrode-excitation subsystem 400 may then be fed into the coil-excitation subsystem 412 as an initial guess or a hard constraint. Another example may be the T-intersection scenario. If one or more of the subsystems indicate that the inclination angle θ is close to 900 (for example, larger than 80°, or larger than 85°), the determination of θ may be assigned to the coil-excitation subsystem 412, since the electrode-excitation system 400 may perform poorly in that particular scenario. The θ value found by the coil-excitation subsystem 412 may then be fed into the electrode-excitation subsystem 400 as an initial guess or a hard constraint. Another example may be the end-of-well scenario. If one or more of the subsystems indicate that |E/D| is less than unity, the determination of E may be assigned to the electrode-excitation subsystem 400, since that subsystem may be substantially more sensitive to that parameter near the end of the target wellbore 104.

Figure 7:
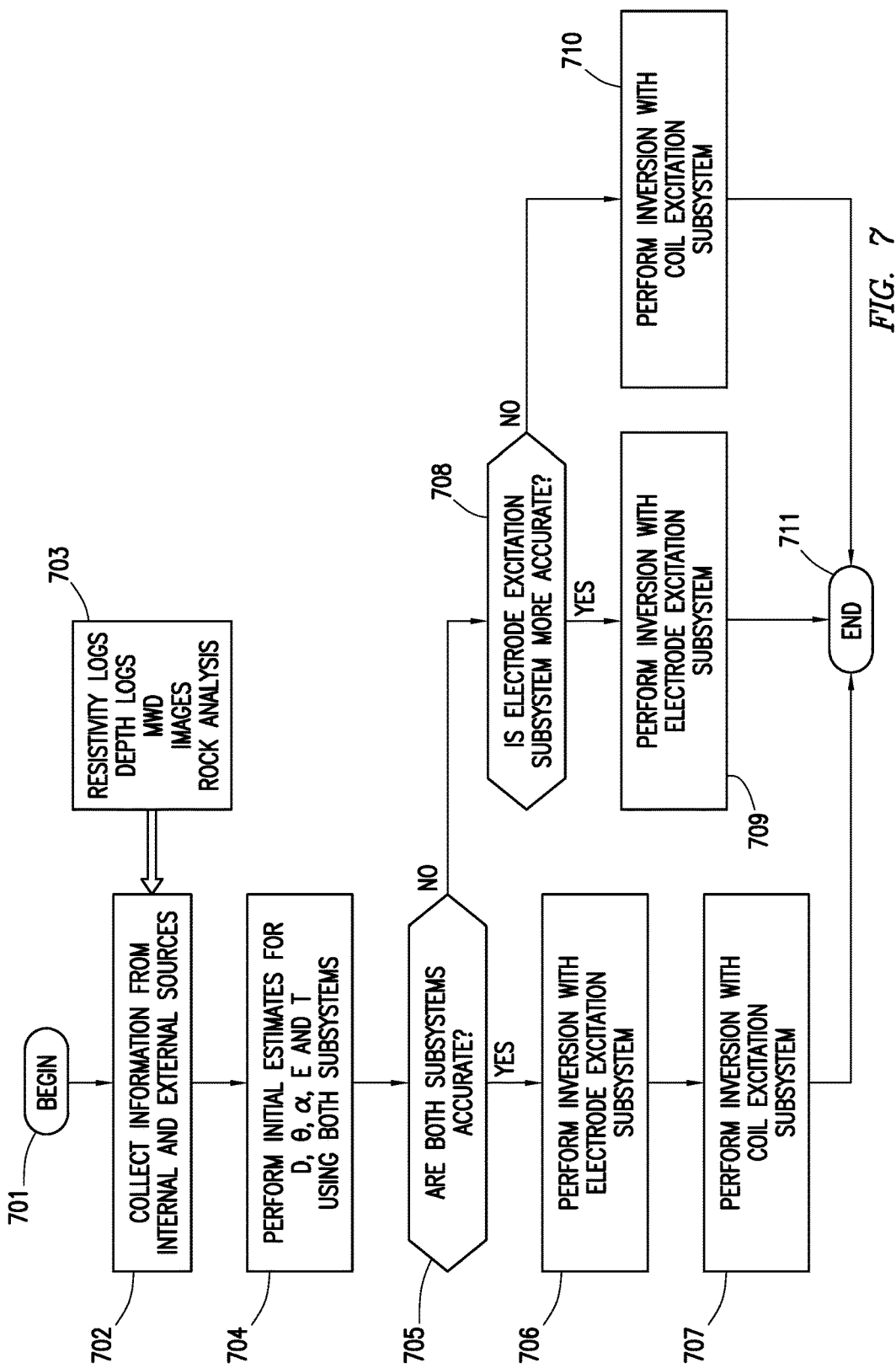
FIG. 7 illustrates a flow diagram of example technique for eliminating one subsystem from an inversion process based on external and internal inputs.

FIG. 7 illustrates an example workflow associated with eliminating one subsystem from an inversion process based on external and internal inputs. In block 701, the method may begin. In block 702, information may be collected from internal and external sources, such as, for example, resistivity logs, depth logs, measuring-while-drilling (MWD) records, borehole images, and/or rock analysis methods, as shown in block 703. In block 704, initial estimates may be performed for the ranging parameters (e.g., D, θ, α, E, and T) using both subsystems. In block 705, a determination if both subsystems are accurate may be performed. This can be made comparing each of the above ranging parameters to the accurate range of each subsystem. Accurate ranges may be calculated through sensitivity analysis or experimentally. In the case of sensitivity analysis, each ranging parameter in the ranging parameters may be perturbed and the resulting change in the simulated measurements corresponding to the ranging parameters may be calculated (for example as a L2-norm of the simulated results). Higher changes in the measurements indicate high sensitivity, and lower changes indicate low sensitivity. Changes in the measurement may also be normalized with the expected errors in the measurement. If both subsystems are accurate, then an inversion may be performed with the electrode-excitation subsystem 400 (shown in FIG. 4A) in block 706 and the coil-excitation subsystem 412 (shown in FIGS. 4B-4D) in block 707. If both subsystems are not accurate then a determination may be made on whether the electrode-excitation subsystem 400 is more accurate, as shown in block 708. If the electrode-excitation subsystem 400 is more accurate, then an inversion may be performed with the electrode-excitation subsystem 400, as shown in block 709. Then the method may end in block 711. If the electrode-excitation subsystem 400 is not more accurate, then an inversion may be performed with the coil-excitation subsystem 412, as shown in block 710. Then the method may end in block 711.

The inversion algorithm of one of the subsystems may be given less preference or discarded altogether. Based on inputs from internal or external sources, it may be determined that one of the subsystems may be incapable of providing accurate answers for neither of the ranging parameters (e.g., D, θ, α, E, and T) that are unknown. This may happen if that particular subsystem suffers from a severe loss of signal, a high degree of correlation between measurements, or an external confounding factor that contaminates its inversion algorithm. One example may be the T-intersection scenario. If internal sources (current and previous inversion results from individual subsystems) indicate that the inclination angle θ is close to 90° (for example, larger than 80°, or larger than 85°) and the end of the target wellbore 104 is not nearby (i.e. |E/D| is larger than unity), the electrode-excitation system 400 may be shut off, since it may suffer from a significant signal loss in that regime. Another relevant scenario may be when water-based mud (WBM) is used in drilling. Electrode excitation may perform very poorly with WBM (which is a conductive type of mud), especially if the formation is resistive (for example formation resistivity larger than 10 Ωm). The electrode-excitation subsystem 400 may be shut off if the external sources (resistivity logs, depth logs, rock analysis, etc.) indicate that a high-resistivity formation is being penetrated. Another example scenario may be when the formation being penetrated has rapidly varying resistivity or anisotropy. The coil-excitation subsystem 412 may experience significant degradation in this case, since it is fundamentally more sensitive to fluctuations in the formation resistivity. If this rapid variation is detected by external sources, the coil-excitation subsystem may be shut off.

Figure 8:
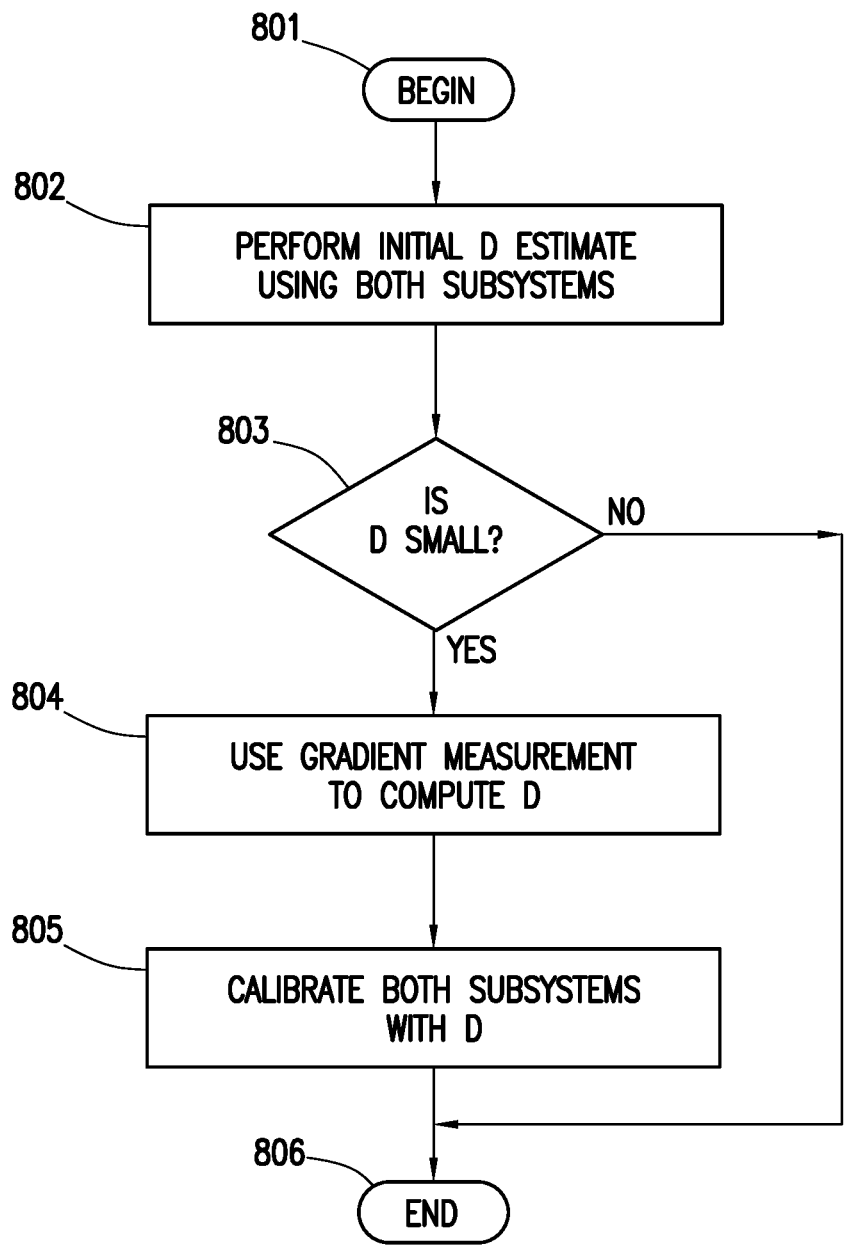
FIG. 8 illustrates a flow diagram of an example technique for using a gradient measurement.
Figure 9:
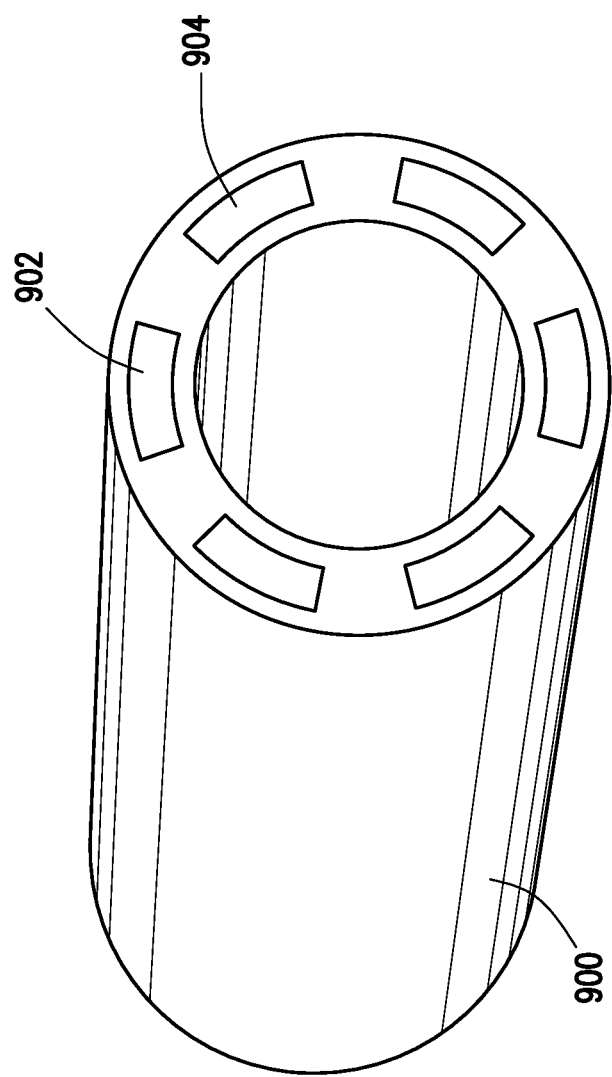
FIG. 9 is a schematic illustration showing placement of at least two magnetometers on a bottom-hole assembly.

FIG. 8 illustrates an example workflow associated with using gradient measurement to calibrate the two subsystems. The method may begin in block 801. Initial D estimates may be performed using both subsystems, as shown in block 802. A determination if D is small may be performed, as shown in block 803. If D is small, then a gradient measurement may be used to compute D, as shown in block 804. Then in block 805, both subsystems may be calibrated with D. Then in block 806, the method may end. If D is determined to not be small, then the method may end, as shown in block 806. To determine if D is small, D may be compared to a threshold value. A gradient formula may be used to calculate the target well distance D, which may then be used to calibrate the inversion algorithms of the two subsystems. Calibration may entail the use of D obtained from the gradient formula as an accurate reference for the D estimates of the inversion algorithms of the two subsystems. Having calibrated their D estimates against an accurate reference at small D, both inversion algorithms may perform more reliably at larger D, where the gradient formula may no longer apply. The gradient formula (discussed below) may only work if the target wellbore 104 (shown in FIG. 1) is at a small distance D compared to the inter-component distances on the BHA 122 (shown in FIG. 1), and the current on the target wellbore 104 may be approximated as axially uniform. If the initial estimate from one or more of the two subsystems is that D is small, the actual determination of D may be calculated by a gradient measurement. This may be performed in several ways. For example, the gradient between two of the three tilted coils may be measured. This scenario may be useful if the inclination angle is close to 90°. In another example, at least two magnetometers 902, 904 may be placed at different azimuths around the perimeter of the BHA 900 as illustrated in FIG. 9, and the gradient between at least one pair of magnetometers may be measured. This scenario may be useful if the inclination angle is close to 0°.

A gradient measurement may be performed with two receivers 132 (shown in FIG. 1) separated by a very small distance, for example, a few inches, and may require no knowledge of the target well current. It may assume a target wellbore 104 (shown in FIG. 1) extending to infinity in both directions carrying a uniform, unidirectional current. This assumption may become valid when the BHA 122 (shown in FIG. 1) is very close to the target wellbore 104 (e.g. in a SAGD scenario). The magnetic field created at a distance D from the target wellbore 104 may be then given by:

$$\vec{H}(\vec{r}) = \frac{I_t}{2\pi D}\hat{\phi} \quad (2)$$

where $I_t$ is the target wellbore current and $\hat{\phi}$ is the azimuthal unit vector. The gradient of the magnetic field at the same location, $$\frac{\partial \vec{H}(\vec{r})}{\partial D},$$

is given by $$\frac{\partial \vec{H}(\vec{r})}{\partial D} \approx -\frac{I_t}{2\pi D^2}\hat{\phi} \quad (3)$$

By taking the ratios of $\vec{H}(\vec{r})$ to $$\frac{\partial \vec{H}(\vec{r})}{\partial D},$$

the radial distance to the target wellbore may be determined as follows:

$$D = \left|\frac{\vec{H}(\vec{r})}{\frac{\partial \vec{H}(\vec{r})}{\partial D}}\right| \quad (4)$$

A key assumption in a gradient measurement may be uniform current on the target well.

Figure 10:
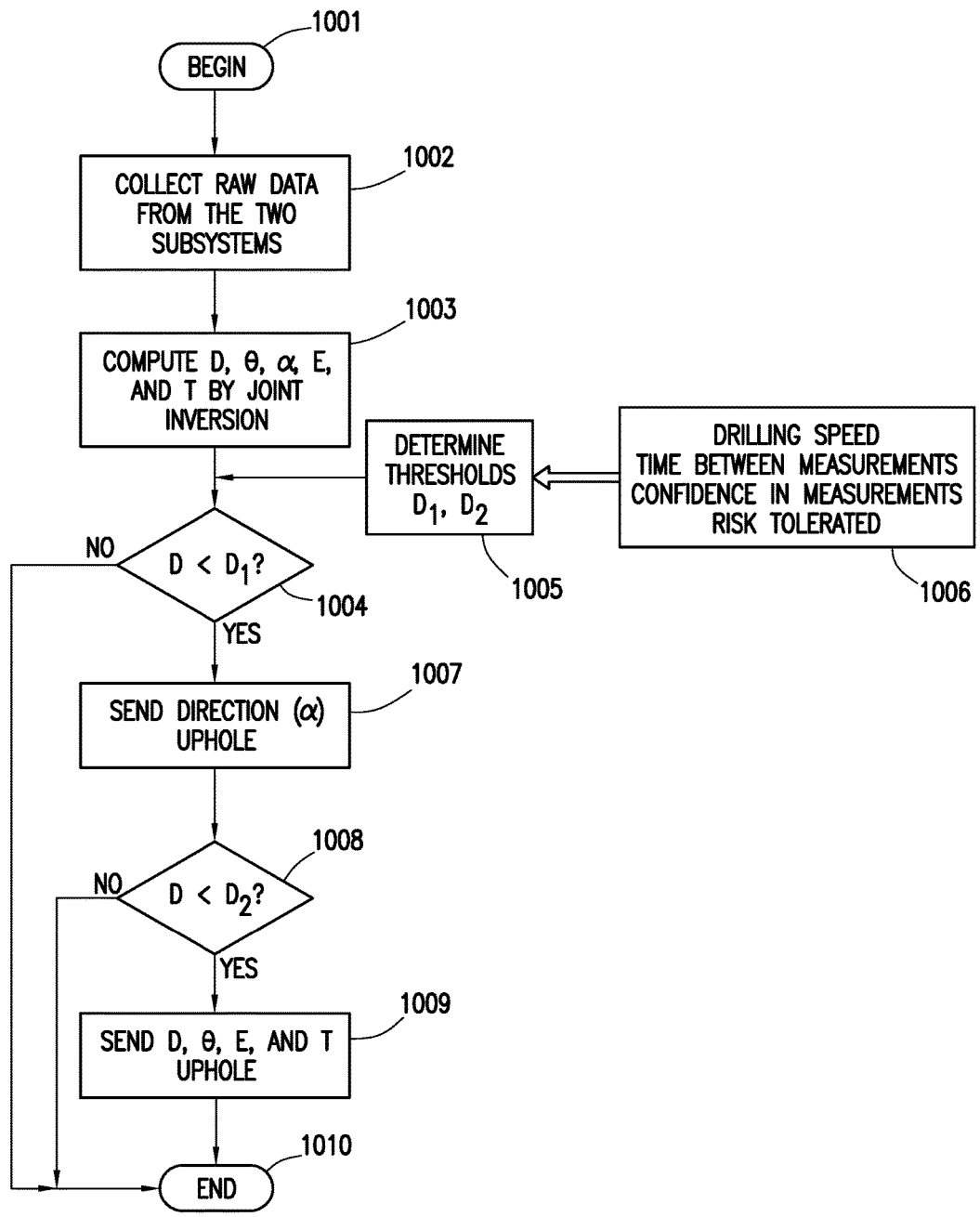
FIG. 10 is flow diagram of an example technique for minimizing use of communication bandwidth between downhole equipment and the surface.

FIG. 10 illustrates an example workflow associated with minimizing use of communication bandwidth between downhole equipment and the surface. The method may begin in block 1001. Raw data may be collected from the two subsystems, as shown in block 1002. In block 1003, the ranging parameters (e.g., D, θ, α, E, and T) may be computed by joint inversion. Thresholds for $D_1$ and $D_2$ may be determined, as shown in block 1005, for example, from drilling speed, time between measurements, confidence in inversion, and/or risk tolerated, as shown in block 1006. If D is less than $D_1$, as shown in block 1004, then the direction data α may be sent uphole, as shown in block 1007. If D is less than $D_2$, then D, θ, α, E, and T may be sent uphole. Then the method may end, as shown in block 1010. If D is not less than $D_1$, then the method may end, as shown in block 1010. If D is not less than $D_2$, then the method may end, as shown in block 1010. Communication between the BHA and the surface may be minimized by analyzing input from both subsystems downhole and transmitting only the inverted results to the surface. The analysis of the raw data from the two subsystems and the subsequent joint inversion may be performed by any of the methods described above. In one example, no data may be transmitted uphole unless the distance D to the target well is found to be less than a threshold $D_1$. In another example, only direction data (α) may be transmitted uphole unless the distance D to the target well is found to be less than a threshold $D_2$. In another example, $D_1 > D_2$, such that no data may be transmitted if $D < D_1$, and only the direction data may be transmitted if $D_1 < D < D_2$. The thresholds $D_1$ and $D_2$ may be determined according to the drilling speed, time between downhole measurements, and the confidence interval in the inverted parameters.

Without limitation, the electromagnetic ranging tool 124 (shown in FIG. 1) may be operated in real-time for determining ranging parameters, which may include range and direction to a target wellbore 104 (shown in FIG. 1). Processing may be performed uphole or downhole, for example, using downhole information handling system 128 (shown in FIG. 1). Real time operation, for example, may allow integration of the ranging parameters with survey data.

Without limitation, a method for electromagnetic ranging of a target wellbore may comprise disposing an electromagnetic ranging tool in a wellbore, wherein the electromagnetic ranging tool may comprise one or more receivers, a coil source and an electrode source; performing a measurement with the one or more receivers of at least one component of a coil-induced magnetic field from the target wellbore to provide a coil measurement, wherein the coil-induced magnetic field may be induced by the coil source; performing a measurement with the one or more receivers of at least component of an electrode-induced electromagnetic field to provide an electrode measurement, wherein the electrode-induced electromagnetic field may be induced by the electrode source; and calculating at least one ranging parameter using, at least in part, the coil measurement and the electrode measurement. The method may further comprise any of the following features in any combination. The method may further comprise estimating a quality factor for one or more initial coil source ranging parameters based on the coil measurement; and estimating a quality factor for one or more initial electrode source ranging parameters based on the electrode measurement; wherein the quality factor for the one or more initial coil source ranging parameters and the quality factor for the one or more initial electrode source ranging parameters may be used in the calculating at least one ranging parameter. The method may further comprise selecting between the initial coil source ranging parameters and the initial electrode source ranging parameters based on their respective quality factors to obtain the at least one ranging parameter. The method may further comprise using a subset of the initial coil source ranging parameters as an initial guess or constraint in determining the one or more initial electrode source ranging parameters and/or using a subset of the initial electrode source ranging parameters as an initial guess or constraint in determining the one or more initial coil source ranging parameters. The method may further comprise choosing the subset based on the quality factor of one or more initial coil source ranging parameters and the quality factor of one or more initial electrode source ranging parameters. The method may further comprise calculating weights based the quality factor of one or more initial coil source ranging parameters and the quality factor of one or more initial electrode source ranging parameters and applying the weights to the one or more initial coil source ranging parameters and the one or more initial electrode source ranging parameters to provide the at least one ranging parameter. At least one of the weights may be 0 or 1. The method may further comprise communicating the at least one ranging parameter to a surface of the wellbore if at least one of the quality factors of one or more initial coil source ranging parameters or the quality factor of one or more initial electrode source ranging parameters are above a threshold. The method may further comprise estimating a common quality factor of the initial coil source ranging parameters and the initial electrode source ranging parameters. The method may further comprise communicating the at least one ranging parameter to a surface of the wellbore if the common quality factor is above a threshold. The estimating a common quality factor may comprise utilizing a difference of one or more of the initial coil source ranging parameters and one or more of the initial electrode source ranging parameters. The method may further comprise visualizing the common quality factor on a video display. The method may further comprise calculating a target well shape wherein the coil measurement and the electrode measurement may not be used if the common quality factor is below a threshold. The calculating may use an inversion, and wherein the method may further comprise making one or more modifications to improve the inversion if the common quality factor is below a threshold. The one or more modifications may comprise at least one or more of increasing an excitation current for the coil source and/or the electrode source, extending a listening time for the performing steps, recalibrating the coil source and/or the electrode source, repeating the performing steps and different azimuthal orientations, using alternative optimization algorithms for the inversion, or increasing a number of initial guesses in an optimization algorithm for the inversion. The method may further comprise communicating the at least one ranging parameter to a surface of the wellbore if distance to the target wellbore is less than a threshold distance. The performing a measurement with the one or more receivers of at least one component of a coil-induced magnetic field and the performing a measurement with the one or more receivers of at least one component of an electrode-induced magnetic field may share at least one of the one or more receivers.

A system may comprise an electromagnetic ranging tool disposed in a wellbore, wherein the electromagnetic ranging tool may comprise an information handling system, one or more receivers, a coil source and an electrode source; wherein the electromagnetic ranging tool may be configured to perform a measurement with the one or more receivers of at least one component of a coil-induced magnetic field from a target wellbore to provide a coil measurement, wherein the coil-induced magnetic field may be induced by the coil source; wherein the electromagnetic ranging tool may be configured to perform a measurement with the one or more receivers of at least component of an electrode-induced electromagnetic field to provide an electrode measurement, wherein the electrode-induced electromagnetic field may be induced by the electrode source; and wherein the electromagnetic ranging tool may be configured to calculate at least one ranging parameter using, at least in part, the coil measurement and the electrode measurement, with the information handling system, ranging parameters based on the magnetic coil measurement and the electrode measurement. The electromagnetic ranging tool may be configured to estimate a quality factor for one or more initial coil source ranging parameters based on the coil measurement; and wherein the electromagnetic ranging tool may be configured to estimate a quality factor for one or more initial electrode source ranging parameters based on the electrode measurement; wherein the quality factor for the one or more initial coil source ranging parameters and the quality factor for the one or more initial electrode source ranging parameters may be used in the calculating at least one ranging parameter.

Without limitation, a system may comprise an electromagnetic ranging tool disposed in a wellbore, wherein the electromagnetic ranging tool comprises one or more receivers, a coil source and an electrode source; and an information handling system, wherein the information handling system is operable to calculate at least one ranging parameter using, at least in part, a coil measurement and an electrode measurement, wherein the coil measurement comprises a measurement of at least one component of a magnetic field induced by the coil source, wherein the electrode measurement comprises a measurement of at least one component of a magnetic field induced by the electrode source. The system may comprise any of the following features in any combination. The information handling system may be operable to estimate a quality factor for one or more initial coil source ranging parameters based on the coil source measurement; estimate a quality factor for one or more initial electrode source ranging parameters based on the electrode measurement, wherein the quality factor for the one or more initial coil source ranging parameters and the quality factor for the one or more initial electrode source ranging parameters are used in the calculation of the at least one ranging parameter. The information handling system may be operable to estimate a common quality factor of the initial coil source ranging parameters and the initial electrode source ranging parameters.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for electromagnetic ranging of a target wellbore, comprising:
   disposing an electromagnetic ranging tool in a wellbore, wherein the electromagnetic ranging tool comprises one or more receivers, a coil source and an electrode source;
   inducing an electrode-induced electromagnetic field in a target wellbore with the electrode source;
   sensing the electrode-induced electromagnetic field from the target wellbore with the one or more receivers;
   inducing a coil-induced electromagnetic field in a target wellbore by a coil source;
   sensing the coil-induced electromagnetic field from the target wellbore with the one or more receivers;
   performing a measurement with the one or more receivers of at least one component of a coil-induced electromagnetic field to provide a coil measurement and of at least one component of the electrode-induced electromagnetic field to provide an electrode measurement;
   calculating at least one coil source ranging parameter using, at least in part, the coil measurement; and
   calculating at least one electrode source ranging parameter using, at least in part, the electrode measurement.

2. The method of claim 1, wherein the method further comprises:
   estimating a quality factor for one or more initial coil source ranging parameters based on a coil measurement; and
   estimating a quality factor for one or more initial electrode source ranging parameters based on the electrode measurement;
   wherein the quality factor for the one or more initial coil source ranging parameters and the quality factor for the one or more initial electrode source ranging parameters are used in the calculating at least one ranging parameter.

3. The method of claim 2 further comprising selecting between the initial coil source ranging parameters and the initial electrode source ranging parameters based on their respective quality factors to obtain the at least one ranging parameter.

4. The method of claim 2 further comprising using a subset of the initial coil source ranging parameters as an initial guess or constraint in determining the one or more initial electrode source ranging parameters and/or using a subset of the initial electrode source ranging parameters as an initial guess or constraint in determining the one or more initial coil source ranging parameters.

5. The method of claim 4 further comprising choosing the subset based on the quality factor for one or more initial coil source ranging parameters and the quality factor for one or more initial electrode source ranging parameters.

6. The method of claim 2 further comprising calculating weights based the quality factor for one or more initial coil source ranging parameters and the quality factor for one or more initial electrode source ranging parameters and applying the weights to the one or more initial coil source ranging parameters and the one or more initial electrode source ranging parameters to provide the at least one ranging parameter.

7. The method of claim 6, wherein at least one of the weights is 0 or 1.

8. The method of claim 2, further comprising communicating the at least one ranging parameter to a surface of the wellbore if at least one of the quality factor for one or more initial coil source ranging parameters or the quality factor for one or more initial electrode source ranging parameters are above a threshold.

9. The method of claim 2 further comprising estimating a common quality factor of the initial coil source ranging parameters and the initial electrode source ranging parameters.

10. The method of claim 9 further comprising communicating the at least one ranging parameter to a surface of the wellbore if the common quality factor is above a threshold.

11. The method of claim 9, wherein the estimating a common quality factor comprises utilizing a difference of one or more of the initial coil source ranging parameters and one or more of the initial electrode source ranging parameters.

12. The method of claim 9 further comprising visualizing the common quality factor on a video display.

13. The method of claim 12 further comprising calculating a target well shape wherein the coil measurement and the electrode measurement are not used if the common quality factor is below a threshold.

14. The method of claim 12, wherein the calculating uses an inversion, and wherein the method further comprising making one or more modifications to improve the inversion if the common quality facture is below a threshold.

15. The method of claim 14, wherein the one or more modifications comprises at least one or more of increasing an excitation current for the coil source and/or the electrode source, extending a listening time for the performing steps, recalibrating the coil source and/or the electrode source, repeating the performing steps and different azimuthal orientations, using alternative optimization algorithms for the inversion, or increasing a number of initial guesses in an optimization algorithm for the inversion.

16. The method of claim 1, further comprising communicating the at least one ranging parameter to a surface of the wellbore if distance to the target wellbore is less than a threshold distance.

17. The method of claim 1, wherein the performing a measurement with the one or more receivers of at least one component of a coil-induced magnetic field and the performing a measurement with the one or more receivers of at least one component of an electrode-induced magnetic field share at least one of the one or more receivers.

18. A system comprising:
an electromagnetic ranging tool disposed in a wellbore, wherein the electromagnetic ranging tool comprises:
an electrode source configured to induce an electrode-induced magnetic field in a target wellbore;
one or more receivers configured to sense the electrode-induced electromagnetic field from the target wellbore and to sense a coil-induced electromagnetic field from the target wellbore;
a coil source configured to induce the coil-induced electromagnetic field in the target wellbore; and
an information handling system, wherein the information handling system is operable to calculate at least one coil source ranging parameter using, at least in part, a coil measurement and at least one electrode source ranging parameter using, at least in part, an electrode measurement, wherein the coil measurement comprises a measurement of at least one component of a magnetic field induced by the coil source, wherein the electrode measurement comprises a measurement of at least one component of a magnetic field induced by the electrode source.

19. The system of claim 18, wherein the information handling system is operable to estimate a quality factor for one or more initial coil source ranging parameters based on the coil measurement; estimate a quality factor for one or more initial electrode source ranging parameters based on the electrode measurement, wherein the quality factor for the one or more initial coil source ranging parameters and the quality factor for the one or more initial electrode source ranging parameters are used in the calculation of the at least one ranging parameter.

20. The system of claim 19, wherein the information handling system is operable to estimate a common quality factor of the initial coil source ranging parameters and the initial electrode source ranging parameter.

* * * * *